United States Patent [19]
Hopenfeld

[11] Patent Number: 5,522,415
[45] Date of Patent: Jun. 4, 1996

[54] AUTOMATIC SHUT-OFF VALVE FOR LIQUID STORAGE TANKS AND METHOD OF INSTALLATION

[76] Inventor: Joram Hopenfeld, 1724 Yale Pl., Rockville, Md. 20850

[21] Appl. No.: 359,131

[22] Filed: Dec. 19, 1994

[51] Int. Cl.⁶ .......................... F16K 43/00; F16K 31/26; F16K 33/00
[52] U.S. Cl. .......................... 137/15; 137/315; 137/426; 137/443; 137/445; 137/614.2; 137/854; 141/198; 251/280
[58] Field of Search .......................... 137/15, 315, 434, 137/443, 445, 426, 448, 527, 613, 614.2, 851, 852, 854; 141/198; 251/279, 280

[56] References Cited

U.S. PATENT DOCUMENTS

| | | | |
|---|---|---|---|
| Re. 33,555 | 3/1991 | Draft | 141/198 |
| 4,230,142 | 10/1980 | Saarem et al. | 137/445 |
| 4,266,582 | 5/1981 | Sergent | 141/198 |
| 4,313,459 | 2/1982 | Mylander | 137/416 |
| 4,416,302 | 11/1983 | Schoepe | 137/443 |
| 4,483,367 | 11/1984 | Ross, Jr. et al. | 137/416 |
| 4,630,655 | 12/1986 | Fleischer et al. | 141/198 |
| 4,635,480 | 1/1987 | Hrncir et al. | 137/416 |
| 4,735,230 | 4/1988 | Detloff | 137/315 |
| 4,986,320 | 1/1991 | Kesterman et al. | 141/198 |
| 5,007,450 | 4/1991 | Babb et al. | 137/315 |
| 5,010,915 | 4/1991 | Johnson et al. | 137/423 |
| 5,027,870 | 7/1991 | Butterfield | 141/198 |
| 5,095,937 | 3/1992 | LeBlanc et al. | 137/423 |
| 5,141,019 | 8/1992 | LeBlanc et al. | 137/423 |
| 5,152,315 | 10/1992 | Lagache | 137/448 |
| 5,163,470 | 11/1992 | Maeshiba | 141/198 |
| 5,174,345 | 12/1992 | Kesterman et al. | 141/198 |
| 5,207,241 | 5/1993 | Babb | 137/447 |
| 5,235,999 | 8/1993 | Lindquist et al. | 137/15 |
| 5,241,983 | 9/1993 | Lagache | 137/448 |
| 5,386,844 | 2/1995 | Kennedy | 137/445 |

*Primary Examiner*—George L. Walton

[57] ABSTRACT

An automatic shut-off valve assembly for controlling the fill level in liquid storage tanks, sized to fit through existing filler pipes, includes a tubular body having a flow-blocking diverter plate on the lower end, a series of peripheral through-ports disposed upstream of the diverter plate and a concentric sleeve slidably mounted on the valve body and responsive to longitudinal forces transmitted through a pivotable linkage from a cantilevered float. The linkage permits the float to be extended downward along the valve axis for insertion into the tank, then to rotate outward into a cantilevered position. As the float rises in response to the buoyant force of the rising liquid, the sleeve is urged downward by the linkage to sealingly block the ports and limit flow of liquid through the valve. The tank fill level can be selected by adjusting lengths and angles of linkage members or by manipulating the angle and depth of the valve assembly in the tank.

28 Claims, 7 Drawing Sheets

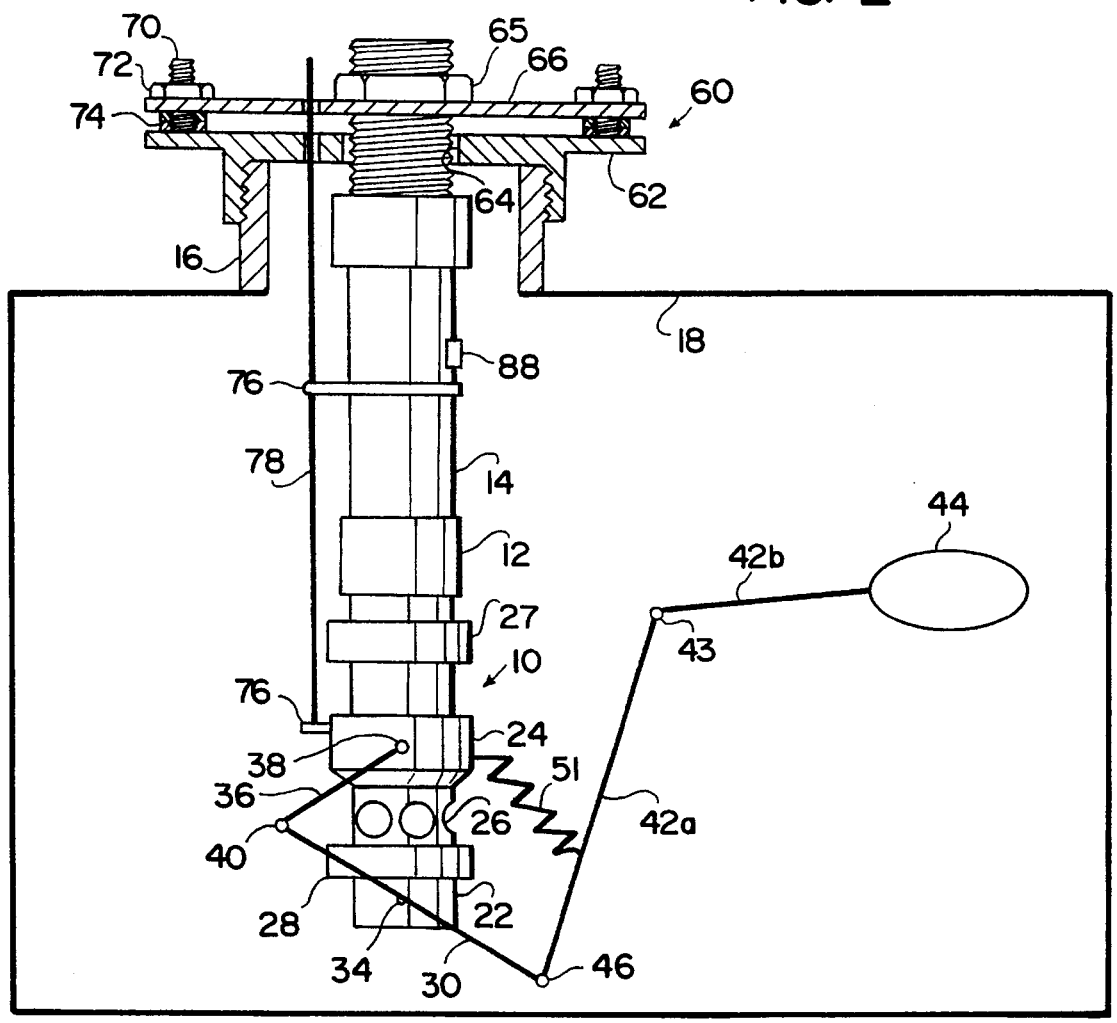

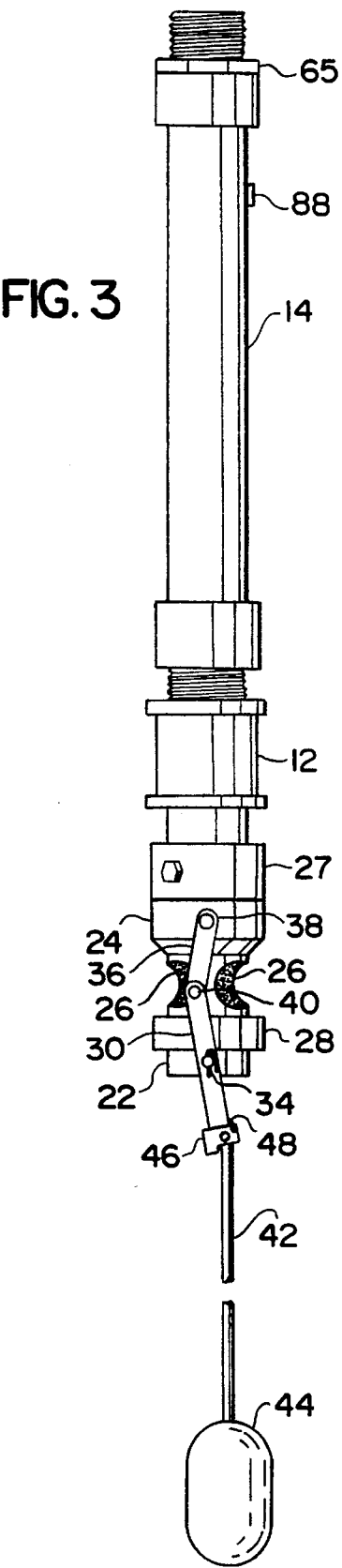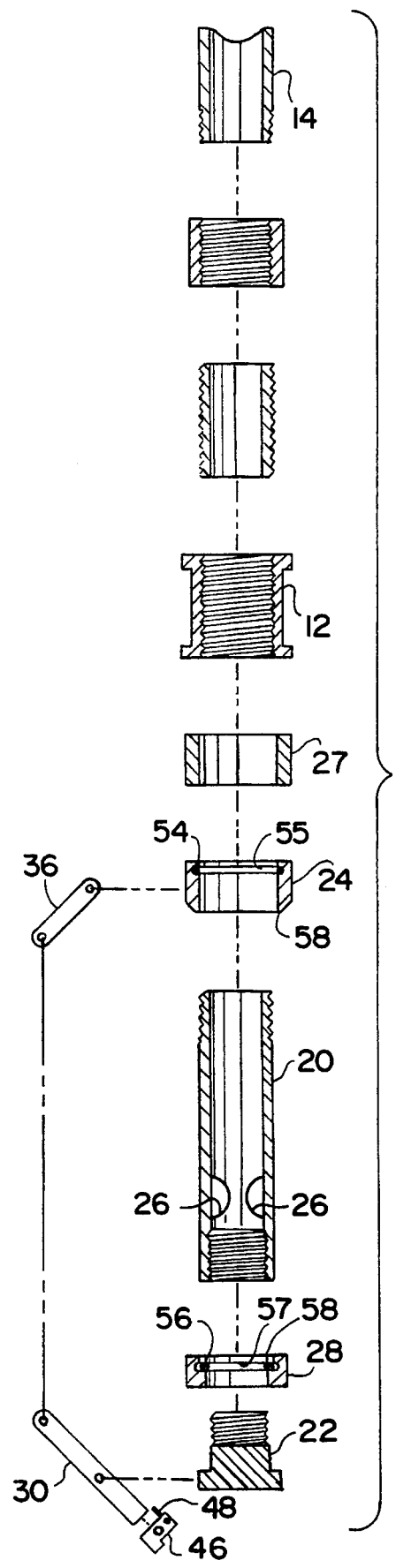

AUTOMATIC SHUT-OFF VALVE FOR LIQUID STORAGE TANKS AND METHOD OF INSTALLATION

BACKGROUND OF THE INVENTION

1. Technical Field

The present invention relates to a device for preventing overfilling of liquid storage tanks and, more particularly, to a float-activated shut-off valve.

2. Discussion of the Prior Art

Overfilling of fuel storage tanks, for example gasoline tanks used at filling or service stations, is recognized as a major source of pollution and a loss of a valuable resource. As a consequence, federal law now requires that existing underground storage tanks be fitted with automatic shut-off devices by Dec. 22, 1998. Shut-off valves designed to automatically cut-off inflow into tanks before overfilling occurs are being introduced in increasing numbers in anticipation of the new regulations.

Overfilling can be avoided by manually shutting off the flow at the appropriate time. Because operators cannot timely gauge overflows and are susceptible to errors, reliance on manual shut-off is inefficient and uncertain.

Automatic shut-off valves typically employ a float to actuate a valve, which in turn blocks the inflow of the liquid when the level in the tank rises to a predetermined level. They are designed to fit through the opening used to introduce liquid into the tank. Most existing fuel storage tanks have liquid supply sleeves on the order of about four inches in diameter located on the tank top. The need to retrofit existing tanks therefore dictates the need for float sizes which are limited in size and shape, placing significant restrictions on valve design.

A drop tube assembly, described in U.S. Pat. No. 5,235,999 (Lindquist et al), includes a float coaxially located with the drop tube, an elongate conduit extending from the surface to a position near the tank bottom. This float moves up and down along the drop tube, actuating the valve. Such a design significantly restricts the volume of the float of a given length, as the float is limited by the diameter of the opening in the tank and the diameter of the drop tube. Also, inasmuch as the float remains parallel to the valve assembly along the drop tube, it exerts no leverage on the valve, and as a result, insufficient force is generated to completely shut off high flow rates.

Another commercially available valve, the Stopper, manufactured by OPW Fueling Components of Cincinnati, Ohio, uses an in-line cylindrical float that controls a release mechanism to initiate an abrupt valve closure with the hazard of potentially damaging shock or hammer effects.

An alternative design, manufactured by the Clay & Bailey Manufacturing Company of Kansas City, Mo., the MINO Filling Limiter, utilizes a float which fits around half the circumference of the drop tube. The float is attached to the valve by a lever arm. As the float rises, it rotates a ball in the flow conduit. The ball has a through-hole passage defined in one direction allowing fluid flow to pass while the through-hole aligns at least partially with the conduit. The position of the float in the tank regulates the amount of flow through the valve by changing the alignment of the through-hole in a manner that stops the flow when the float assumes a horizontal position and the tank is full. Although the float is attached to a lever arm, the shape of the float is defined by the drop tube, and, in order to accommodate the lever arm, the float cannot occupy the entire cross-sectional area of the drop tube. These restrictions on size, shape, and volume limit the leverage the float can exert on the rotating valve. Major disadvantages of this design are that incremental flow restriction begins as soon as float movement is initiated, increasing the time required to fill the tank and that limitations on the shape of the float frequently preclude use in small tanks because of insufficient clearance.

OBJECTS AND SUMMARY OF THE INVENTION

Accordingly, it is a primary objective of the present invention to provide a method and apparatus for preventing the overfilling of storage tanks.

It is a further object of the present invention to effect a complete cessation of flow into a storage tank on reaching a predetermined fill level without materially increasing the time required for filling the tank.

It is another object of the present invention to provide a rapid yet graduated shut-off of liquid flow into a storage tank to prevent initiation of shock or hammer effects.

It is yet another object of the present invention to provide a shut-off valve configured to be retrofit into existing storage tanks yet having a cantilevered leveraged float assembly.

Moreover, it is an object of the present invention to provide a shut-off valve mechanism having a float constrained in size only by the storage tank access orifice.

It is also an object of the present invention to provide a liquid storage tank automatic shut-off valve allowing unrestricted flow during most of the tank-filling process.

The aforesaid objects are achieved individually and in combination and it is not intended that the invention be construed as requiring that two or more of said objects be combined.

In accordance with the present invention, input flow enters the upper portion of a generally cylindrical valve body, flows down to a diverter plug and outward through ports spaced around the valve body. A concentric cylindrical sleeve slides axially along the valve body in response to leverage force applied through a pivoting cantilevered support assembly by a float attached to the end of the support. As the float is buoyantly forced upward by the rising liquid level in the tank, the sleeve is forced downward to block the flow through the radial ports, or through holes. The float and support assembly are extendable downward along the valve axis during insertion into the tank to allow maximum float cross-sectional area with respect to the tank fill nozzle or input orifice.

The present invention provides an inexpensive, reliable, easily installed and retrofittable method and apparatus for preventing the overflow of liquid storage tanks while minimizing the time required to effect preselectable levels of tank fill.

The above and still further objects, features and advantages of the present invention will become apparent upon considering the following detailed description of preferred embodiments thereof, particularly when viewed in connection with the accompanying drawings wherein like reference numerals in various figures are used to designate like components.

BRIEF DESCRIPTION OF THE DRAWINGS

FIG. 2 is a schematic diagram of a shut-off valve assembly according to the present invention in an open position installed in a liquid storage tank.

FIG. 3 is a side elevation view of the present invention in an open position with the float assembly extending downward for insertion into a tank.

FIG. 4 is an exploded side view of the present invention (without float and float rod) in cross-section.

DESCRIPTION OF THE PREFERRED EMBODIMENT

Figure 1:
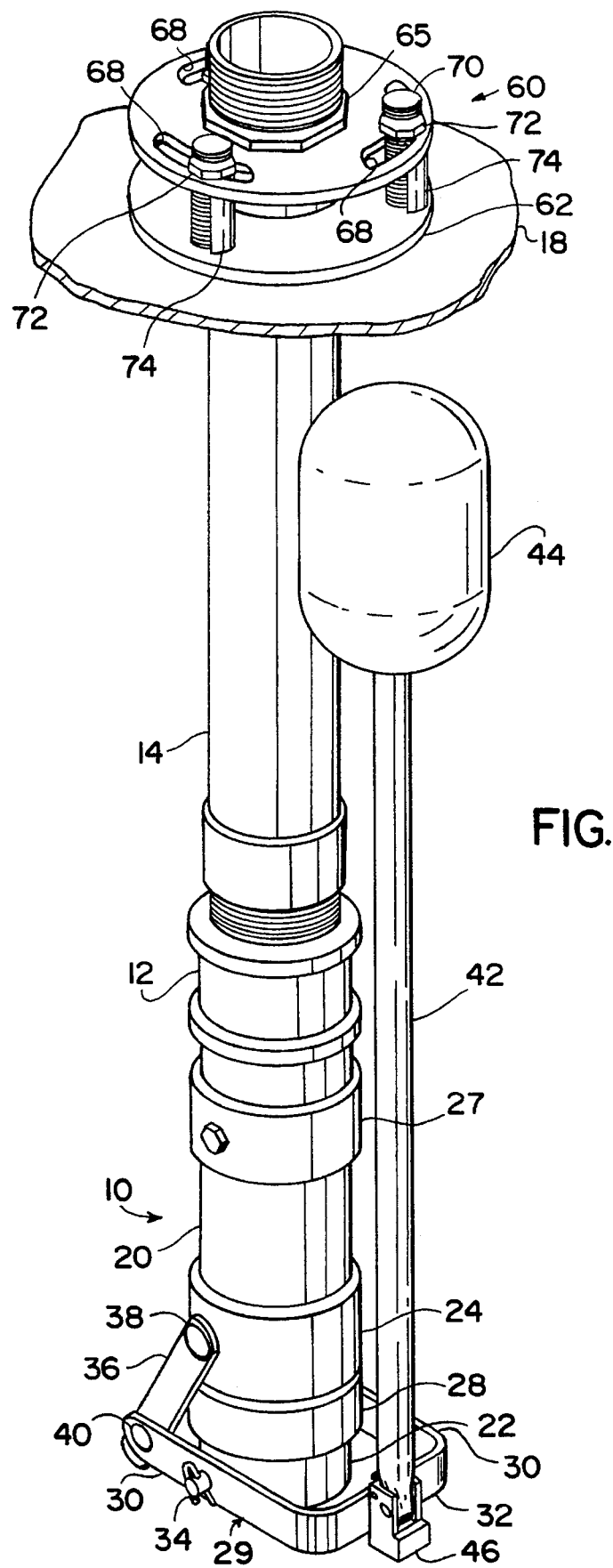
FIG. 1 is a perspective view of a shut-off valve according to the present invention in a closed position.
Figure 5:
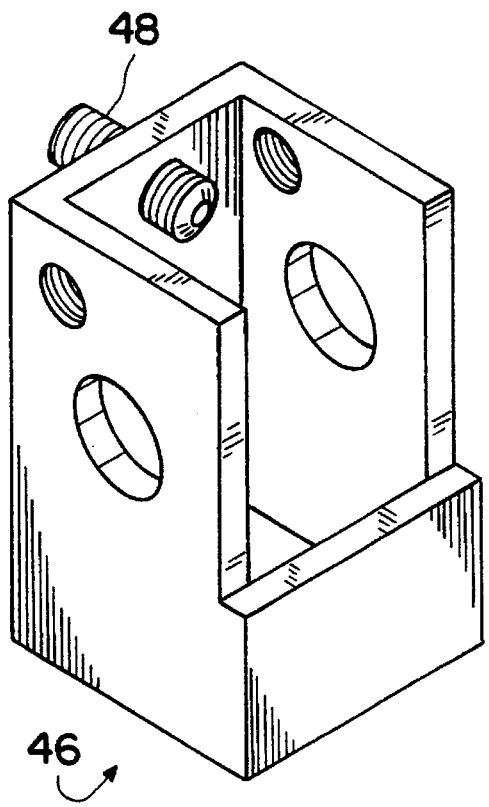
FIG. 5 is a perspective view of a lever arm pivot hinge according to the present invention.

Referring to FIGS. 1–5, a shut-off valve assembly 10 according to the present invention is shown attached by a coupling 12 to the lower end of an open drop tube 14 extending downward through a filler pipe 16 into a liquid storage tank 18.

The upper portion of a valve body or housing 20 is attached to the lower portion of the drop tube by coupling 12. Valve body 20 is a cylinder or tube, closed or sealed at the lower end by, for example, a diverter plug or cap plate 22. A series of flow ports 24 are formed in the lower portion of the housing 20 and communicate from the valve assembly, and consequently from the drop tube and filler pipe, to the inside of the storage tank. A cylindrical or tubular sleeve 24 forming the valve member is sized to completely surround and seal ports 26, and fits tightly but slidably around the valve housing, constrained between an upper collar 27, adjustably positionable between coupling 12 and ports 26, and a lower collar 28 located between ports 26 and diverter plug 22. Both upper collar 27 and lower collar 28 have an outside diameter larger than the inside diameter of sleeve 24.

An open "U"-shaped yoke 29 having two legs 30 and a connecting cross-member 32 is attached to the diverter plug at the midlength of the yoke legs by diametrically opposed pivot pins 34. Rigid linkage bars 36 are attached at the top ends to diametrically opposed pivot pins 38 extending outward from slidable sleeve 24. The bottom ends of linkage bars 36 are attached to pivot joints 40 in the open or free ends of yoke legs 30. A float rod 42 extends from a float 44 to a pivot joint 46, shown in FIG. 5, attached to the midpoint of yoke cross-piece 32. A set screw 48 projecting through the top of pivot joint 46 against float rod 42 or other means can be used to adjust the maximum upward angle assumable by the float and float rod assembly, thereby to adjust the preselected cut-off liquid level in the tank. In addition, the length of the float arm can be varied to control the fill level of the tank.

Alternatively the maximum float rod angle can be adjusted by increasing or decreasing the length of linkage bars 36 thereby adjusting the orientation of yoke legs 30 with respect to the vertical and, in turn, the projection angle of float rod 42. The cross-sectional area of float 44 is sized to fit through filler pipe 16 but is not constrained by other geometry.

Figure 6:
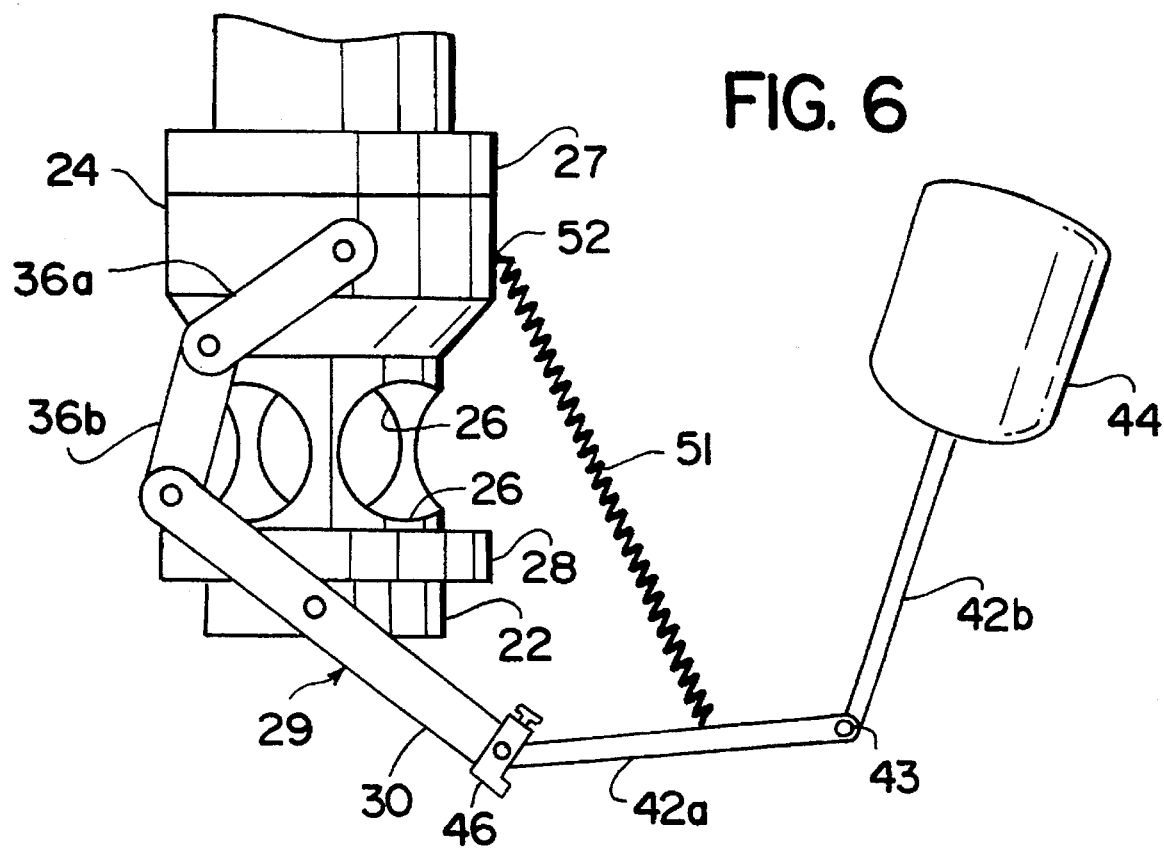
FIG. 6 is a broken side elevation of the shut-off valve of the present invention in an open position having two intermediate rigid links and an articulated float rod.
Figure 8:
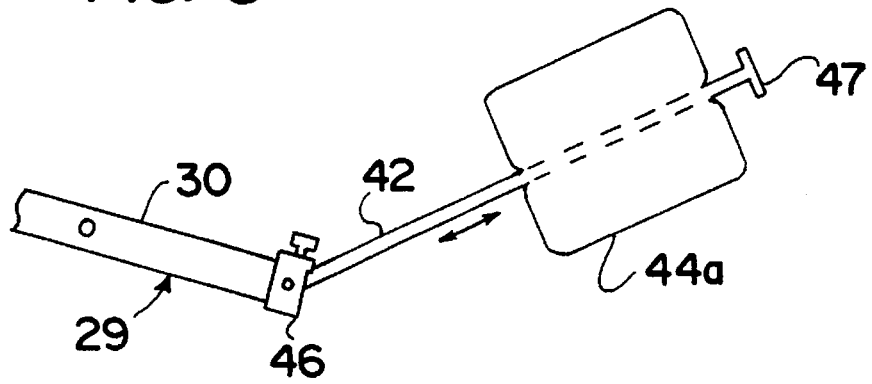
FIG. 8 is a broken side elevation of a float assembly according to the present invention having a toroidal float slidably mounted on the float rod.
Figure 7A:
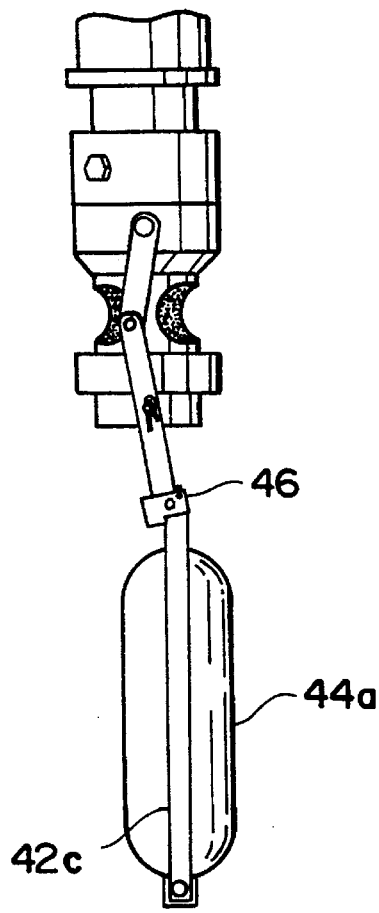
FIG. 7a is a side elevation view of a rotatable float and yoke linkage extended axially in an open valve position for insertion into a tank.
Figure 7B:
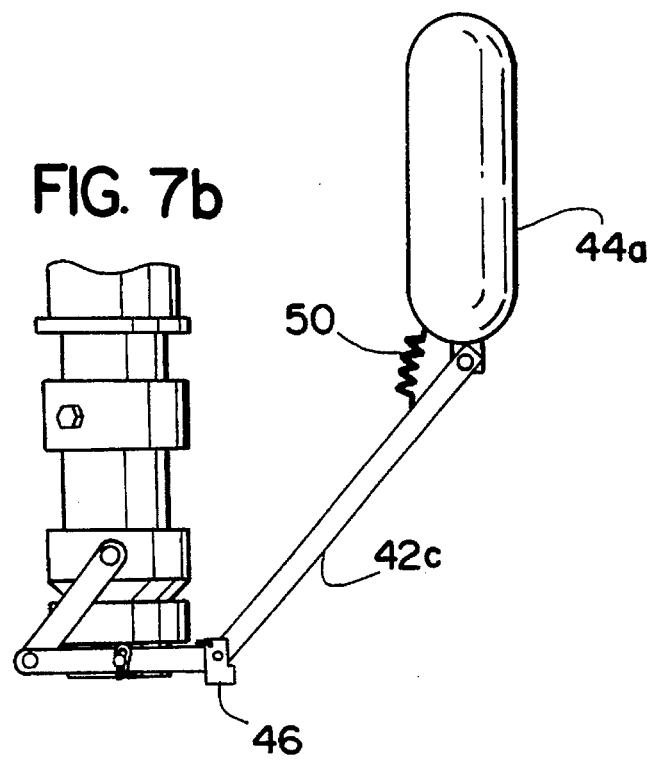
FIG. 7b is a side elevation view of a rotatable float and yoke linkage with the float rotated away from the yoke in a closed valve position.
Figure 7C:
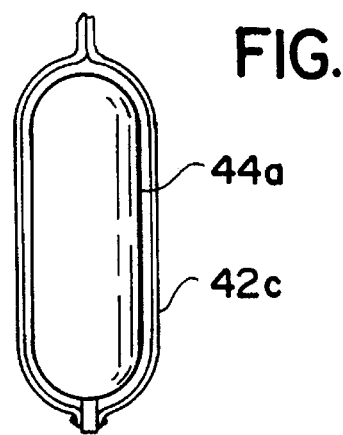
FIG. 7c is a broken front view of the float of FIG. 7a rotated into the yoke for insertion into a tank.

In another embodiment, rigid linkage bars 36 can be replaced by two or more pivotably connected intermediate links 36a and 36b as shown in FIG. 6, for applications where the desired travel of sleeve 24 would require single linkage bars too long to fold within the cross-sectional area of the filler pipe. Additionally, the linkage between the float 44 and the pivot joint 46 may desirably be formed of a plurality of articulated pivotably connected individual links rather than a single rigid rod. FIG. 6 also shows a typical two link arrangement having a first rod 42a pivotably connected to yoke 29 by pivot joint 46 on one end and pivotably connected on the other end to a first end of a second rod 42b by a pivot pin 49. Float 44 is attached to the second end of second rod 42b. Another variation in the float linkage is shown in FIGS. 7a–7c where an oblong closed float yoke 42c is attached at one end to pivot joint 46. A generally cylindrical float 44a is pivotably attached to the opposite end of float yoke 42c and is rotated upward into the interior of the yoke during the insertion process and swings downward and outward inside the tank. An optional biasing spring 50 attached between float yoke 42c and float 44a can be used to urge the float to maintain an orientation presenting the longest possible cross-section to the rising liquid surface. FIG. 8 shows another alternative using a single float rod 42 and a toroidal float 44b formed to slide freely along rod 42 but constrained by pivot joint 46 on the lower end of the rod and by a washer or stop 47 attached to the upper end.

In another modification, represented schematically in FIGS. 2 and 6, a spring 51 acting between the float or float rod and an anchor point 52 located at or near the desired fill level on the valve assembly is used to urge the float upward and allows a smaller float to be used in the assembly.

Figure 9:
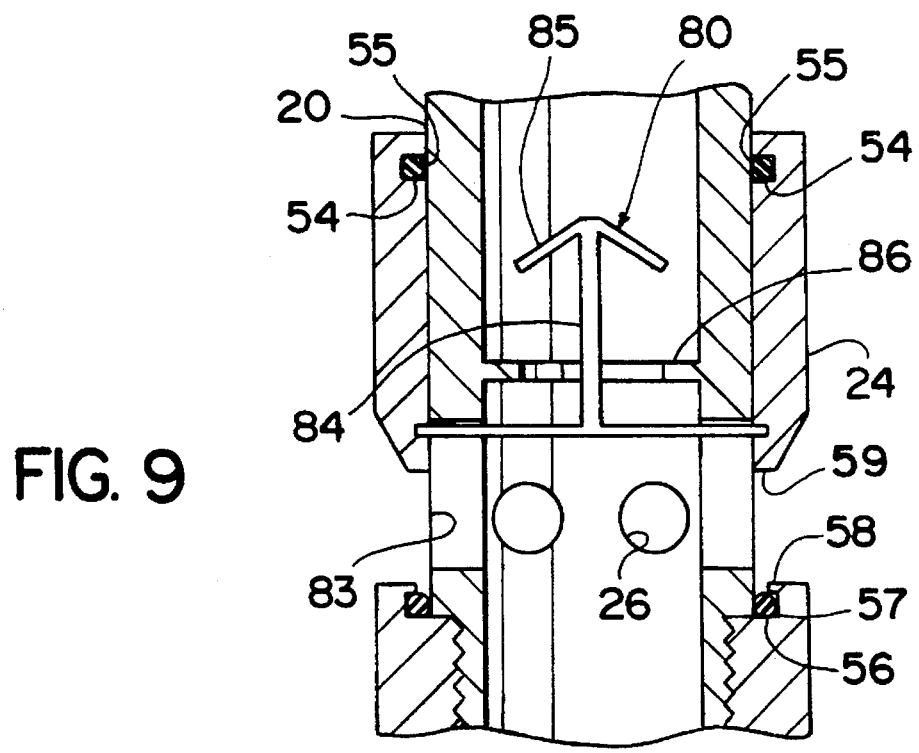
FIG. 9 is a partial side elevation in cross-section of a second embodiment of the present invention having a double swing check valve within the valve body.

As shown in FIGS. 4 and 9, a first O-ring 54 seats in a circumferential groove 55 formed on the inner surface of cylindrical sleeve 24 near the upper end and a second O-ring 56 is held fixedly in a circumferential groove 57 formed in the upper side of lower collar 28 by a lip 5S partially overlapping O-ring 56. The lower edge of sleeve 24 is tapered inward to form a narrow leading or lower edge 59.

The combined orifice area of flow ports 26 is greater by, for example, 50%, than the cross-sectional area of the drop tube 14 to allow unconstrained flow from the tube into the tank until the ports are almost completely covered by surrounding sleeve 24. This minimizes the build-up of fluid pressure opposing the downward valve closing movement of sleeve 24 through the increasingly restricted flow ports 26 and reduces the time required for tank filling, and at the same time permits a very rapid yet still graduated shut-off of flow to prevent shock induced water hammer effects.

A mounting bracket 60 secured to the upper end of drop tube 14, attaches to filler pipe 16 and is rotatable to position the valve assembly in an unobstructed orientation within the tank. The bracket is vertically adjustable to permit final selection of the depth of the valve assembly in the tank and consequently the maximum fill level.

In one embodiment of bracket 60, shown in FIGS. 1 and 2, a pipe cap 62 having an opening 64 for through passage of the threaded upper end of the drop tube 14, is secured to the tank filler pipe 16. A locking nut 65 and oversize washer plate 66 having partially circumferential slots 68 is threaded onto the upper end of the drop tube. Slots 68 align with threaded posts 70 extending longitudinally upward from cap 62. Nuts 72 engage threaded posts 70 to fasten washer plate 66 and thus the valve assembly to the pipe cap. Curved slots 68 allow the assembly to be rotated into a selected angular orientation and shims 74 are inserted between cap 62 and washer plate 66 before nuts 72 are finally tightened to adjust both the depth and angle of the assembly in the tank, and thus to adjust the tank fill level.

Where space permits, guide brackets 76, shown in FIG. 2 can be attached to valve body 20 or drop tube 14 to support and guide a liquid level indicator rod 78 secured to slidable sleeve 24 and projecting upward through mounting bracket 60 to provide an outside observer with visual information on the liquid level within the tank.

In an alternative embodiment adapted particularly to relieve pressure from O-rings 54 and 56 in high flow rate, high pressure liquid loading situations, a spring-loaded double swing check valve 80, shown in FIG. 9 is mounted on an inverted "T"-shaped bracket 81 inside sleeve 24. The horizontal lower arms 82 of bracket 81 extend through longitudinal guide slots 83 in valve body 20 and are fixedly attached to diametrically opposed sides of sleeve 24. Attached to the top of the vertical leg 84 of bracket 81 is a pair of check valve discs 85 spring-urged open to a position interfering with fluid flow down through the valve. The high flow velocity through the valve when the tank has only a low liquid level, and the flow ports are generally unobstructed by sleeve 24, acts against the spring force to fold the discs downward and out of the flow path. As sleeve 24 is urged down by the buoyant force of the rising liquid level in the tank and the port openings begin to be partially obstructed by sleeve 24, flow velocity is reduced, and the spring force increasingly urges the discs outward. As sleeve 24 seals against O-ring 56, the peripheral edges of the fully expanded discs seat against a circumferential ridge 86 formed on the valve body inner surface to cut off further flow and to relieve fluid pressure buildup against O-rings 54 and 56.

In use, upper collar 27 is secured along the valve body in a position to restrict full upward travel of sleeve 24, thus producing an initial small or slight incline or offset angle between the fully extended float mechanism and the valve body longitudinal axis. This offset assures that the float will swing radially outward in the direction of the incline and allows control of the orientation of the float in the tank. The float and float rod are then extended essentially axially beyond the end of diverter plug 22 with the slight control inclination, the valve assembly is inserted through filler pipe 16 into the storage tank and the assembly is rotated to a position to provide the float with unobstructed space to swing radially outward avoiding internal tank structure. Additional control of the cut-off or fill level for the tank can be made at this time or later by adjusting the mounting bracket. Shims can be placed between the pipe cap and bracket washer plate to raise or angle the valve assembly. The mounting bracket is secured to the filler pipe and liquid is directed through the drop tube and valve assembly, escaping into the tank through flow ports 26. As the level of liquid rises in the tank the float rises, pulling the yoke cross-member upward and pivoting the yoke around pins 34 to lower the open ends of yoke legs 30. As the ends of yoke legs 30 descend, linkage bars 36 are forced downward and, in turn, slidable sleeve 24 to which the bars are pinned is forced to move downward toward the flow ports 26. Continued flow into the tank gradually forces the sleeve to move down to completely surround and cover the ports, closing the valve. The tapered lower edge 59 of sleeve 24 cuts through the outward fluid flow exiting ports 26, presenting a reduced cross-sectional area over which the fluid pressure can exert force opposing valve closure. Flow is sealed from escaping around the sleeve by first O-ring 54 in groove 55 at the sleeve upper end and by the force exerted by the float linkage pressing the tapered leading or lower edge 59 of the sleeve into a sealed fit against the second O-ring 56 in lower collar 28 top surface. Additional flow into the tank is prevented until a falling liquid level in the tank allows the float to lower and the sleeve to rise and once again uncover the flow ports. A standard regulating valve 88 can be included between the upper end of drop tube 14 and the tank maximum fill level communicating between the interior flow path of the tube and the empty or void volume above the liquid level in the tank. Such a valve allows excess liquid entrapped in the upper portion of the fill pipe and in the hose used to fill the tank to drain into the tank after the shut-off valve had closed.

Figure 10:
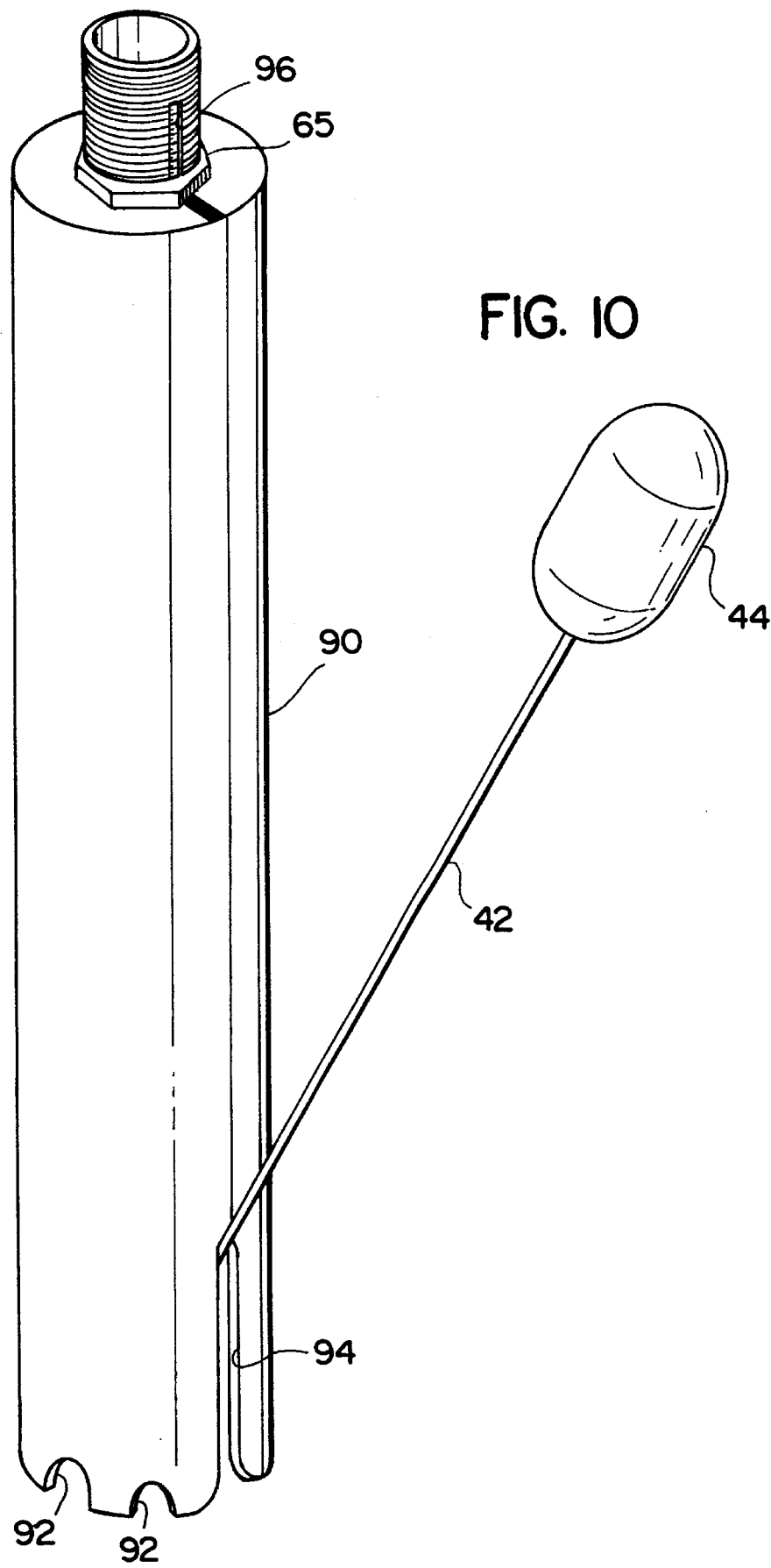
FIG. 10 is a prospective view of a shut-off valve according to the present invention equipped with a flow directing downshroud.

In an alternative embodiment, shown in FIG. 10, a sleeve or shroud 90 directs flow emitted from ports 26 downward toward the tank bottom for use in situations where a potential hazard exists from static electricity created by falling droplets. The shroud has a diameter slightly smaller than that of the filler pipe yet large enough not to interfere with the yoke 29 and linkage bars 36. Arches or ports 92 are formed around the lower portion of the shroud to permit flow from into the tank and a longitudinal slot 94 extends from a bit above the level of diverter plug 22 to the lower end of shroud 90 to allow float rod 42, extended generally axially for insertion into the tank, to rise freely as the liquid level rises and float 44 cantilevers and elevates. Slot 94 can also be used to control the maximum angle allowed to float rod 42 and consequently to control the tank fill level. Shroud 90 can be lowered or raised relative to the valve assembly 10 from outside the tank according to a calibrated scale 96 on the threaded neck of drop tube 14 or valve body 20.

In view of the foregoing, it is apparent that the present invention presents a shut-off valve for liquid storage tanks producing a complete flow stoppage. The combination of a tightly fitting flow blocking sleeve urged sealingly into a resilient O-ring by a cantilevered float mechanism constrained in size only by the access opening in the tank itself provides a retrofit solution to potential waste and pollution induced by overflowing underground storage tanks.

While specific embodiments of the present invention have been shown and described, it will be obvious to those skilled in the art that changes and other modifications may be made without departing from this invention.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. An automatic shut-off valve assembly for preventing flow into a liquid storage tank above a preselected level comprising:

a tubular valve body having an axis, an exterior, an interior, an upper portion terminating at an open upper end to receive liquid, a lower portion terminating at a closed lower end and a plurality of flow ports in said lower portion;

a tubular sleeve slidably movable along said valve body between an open position disposed above said flow ports and a closed position surrounding said flow ports;

an elongate float rod having a first end and a second end;

a float attached to said float rod first end; and a linkage coupling said float rod second end to said tubular sleeve permitting extension of said float rod below said lower end of said valve body in a generally axial alignment thereto during insertion of said valve assembly into a tank and permitting pivotal movement of said float rod to selective, adjustable positions extending angularly from said valve body after said insertion for moving said tubular sleeve from said open position to said closed position when liquid in said storage tank reaches said preselected level and said float rod is moved from said axial alignment position after said insertion to said generally angular position as said liquid level approaches said preselected level.

2. The shut-off valve assembly of claim 1 wherein said float rod has an extended position aligned generally axially with said valve body for insertion into a liquid storage tank.

3. The shut-off valve assembly of claim 1 wherein said tubular valve body has a cross-sectional area, said plurality of a flow ports has an aggregated total cross-sectional area, and said flow port total cross-sectional is greater than said valve body cross-sectional area.

4. The shut-off valve assembly of claim 1 wherein said slidable tubular sleeve has an upper end and a lower end and said lower end is tapered to a reduced cross-sectional area for reducing fluid pressure force opposing sleeve movement to said closed position.

5. The shut-off valve assembly of claim 1 further comprising means for producing an angular offset between said valve body and said float rod during extension for insertion for controlling the direction of said pivotal movement.

6. The shut-off valve assembly of claim 5 wherein said angular offset is produced by an upper collar adjustably securable in concentric fit around said valve body upper portion, said upper collar secured in a position to limit upward movement of said sleeve and through said linkage to prevent complete extension of said float rod.

7. The shut-off valve assembly of claim 1 wherein said tubular sleeve has an upper end, a lower end and sealing means disposed between said valve body and said sleeve upper end.

8. The shut-off valve assembly of claim 7 wherein said sleeve has an inner surface, a circumferential groove defined in said inner surface and said sealing means is an O-ring retainably secured in said groove.

9. The shut-off valve assembly of claim 1 wherein said tubular sleeve has an upper end, a lower end and sealing means disposed between said valve body and said sleeve lower end.

10. The shut-off valve of claim 9 further comprising a lower collar having an upper side and a lower side, said collar secured concentrically around said valve body below said flow ports, said collar having a groove formed in said upper side, and an O-ring retainably secured in said groove for providing a resilient seal between said sleeve and said collar.

11. The shut-off valve assembly of claim 1 further comprising means for limiting said pivotal movement of said float rod to adjust said storage tank level moving said sleeve to said closed position.

12. The shut-off valve assembly of claim 1 further comprising a liquid level indicator rod attached to said sleeve and extending upward alongside said valve body and outside said tank for visual inspection.

13. The shut-off valve assembly of claim 12 further comprising means for selectively adjusting the depth of said valve body in said liquid storage tank to adjust said storage tank liquid level moving said sleeve to said closed position.

14. The shut-off valve assembly of claim 1 further comprising a mounting bracket for attaching said valve body to said liquid storage tank.

15. The shut-off valve assembly of claim 14 further comprising a drop tube having a first end and a second end, said drop tube attached on said first end to said mounting bracket and on said second end to said valve body upper end for extending said valve body into said tank.

16. The shut-off valve assembly of claim 1 wherein said linkage includes a generally U-shaped yoke having two generally parallel legs each having a first end, a midpoint and a second end, and a cross-member attached across said first ends, said legs pivotably attached at said midpoints to diametrically opposed points on said valve body lower portion, a pair of linkage bar assemblies each having an upper end and a lower end, said linkage bar assemblies pivotably attached at said upper ends to said sleeve, said linkage bar assemblies pivotably attached at said lower ends to said yoke leg second ends, and a pivot joint for attaching said float rod to said cross-member.

17. The shut-off valve assembly of claim 16 wherein each of said pair of linkage bar assemblies comprises a single rigid bar.

18. The shut-off valve assembly of claim 16 wherein each of said pair of linkage bar assemblies comprises a plurality of rigid linkage bars pivotably attached end to end to form a pair of articulated linkage bar assemblies.

19. The shut-off valve assembly of claim 1 wherein said float rod is a rigid rod.

20. The shut-off valve assembly of claim 1 wherein said float rod comprises is a plurality of rigid rods pivotably attached end to end.

21. The shut-off valve assembly of claim 1 wherein said float rod comprises a rod attached at a first end to said linkage, a stop washer attached at a second end of said rod, and a toroidal float coaxially mounted on said rod and free to slide along said rod.

22. The shut-off valve assembly of claim 1 wherein said float rod comprises an oblong closed yoke having a first end and a second end, said yoke attached at said first end to said linkage and pivotably attached at said second end to an oblong float sized to rotate freely into said yoke for insertion into a tank and to rotate out of said yoke after insertion into said tank.

23. The shut-off valve assembly of claim 1 further comprising a first end and a second end, said spring attached at said first end to said float rod and at said second end to said valve body.

24. The shut-off valve of claim 1 wherein said selectively adjustable float rod positions are controlled by a set screw.

25. The shut-off valve assembly of claim 1 further comprising a tubular shroud coaxial to said valve assembly and extending downward past said ports for directing liquid flow toward said tank bottom, said shroud having a longitudinal slot extending from the lower end to a point above said valve body lower portion and aligned with the direction of rotation of said float rod to permit unobstructed rotation of said float rod.

26. The shut-off valve assembly of claim 1 further comprising a spring-loaded check valve mounted within said valve body interior above said flow ports, said check valve having a plurality of discs sized to cooperatively obstruct all flow through said valve body when spring-urged into a fully expanded position whereupon said discs seat sealingly against a circumferential ridge formed on said tubular valve body interior surface, said spring-urging having sufficient force to expand said discs against low liquid flow velocities in said valve body and insufficient force to prevent folding away of said discs in high liquid flow velocities.

27. The method of installing an automatic shut-off valve assembly having an open position and a closed position in a storage tank comprising the steps of:

(a) Adjusting the maximum pivot angle defined between an elongate float rod having a float on a first end and a linkage coupling a second end of said float rod to a tubular sleeve slidably mounted to move along a tubular valve body in response to movement of said float from a position defining an angle less than said maximum pivot angle allowing flow through said valve assembly while said valve assembly is in said open position to a position defining an angle generally equal to said maximum pivot angle for closing said valve assembly;

(b) rotating said elongate float rod and said float into an axial position extending downward below said valve assembly generally along said valve assembly axis;

(c) inserting said valve assembly into a storage tank by first inserting said extending said float and said float rod into the fill tube of said storage tank; and (d) positioning said valve assembly inside said storage tank at a height whereby the buoyant force exerted on said float by a predetermined level of liquid in said tank rotates said float and said float rod from said axial position upward into said maximum pivot angle and raises said float to cut off flow through said valve assembly.

28. The method of claim 26 further comprising the step of producing an angular offset between said valve body and said float rod during extension for insertion for controlling the direction of upward rotation of said float rod.

* * * * *